(12) United States Patent
Wang et al.

(10) Patent No.: US 7,575,380 B2
(45) Date of Patent: Aug. 18, 2009

(54) INTEGRATED OPTICAL FIBER AND ELECTRO-OPTICAL CONVERTER

(75) Inventors: Xiaozhong Wang, Sunnyvale, CA (US); Albert T. Yuen, Palo Alto, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 10/965,984

(22) Filed: Oct. 15, 2004

(65) Prior Publication Data

US 2006/0088251 A1    Apr. 27, 2006

(51) Int. Cl.
G02B 6/36    (2006.01)
H01R 33/945    (2006.01)

(52) U.S. Cl. .............................. 385/89; 385/88; 385/92; 439/577

(58) Field of Classification Search ............. 385/88–92, 385/100; 439/577
See application file for complete search history.

(56) References Cited

U.S. PATENT DOCUMENTS

| | | | |
|---|---|---|---|
| 3,663,822 A * | 5/1972 | Uchida ........................ 250/551 |
| 3,792,284 A * | 2/1974 | Kaelin ......................... 250/551 |
| 3,794,841 A | 2/1974 | Cosentino et al. |
| 4,156,206 A | 5/1979 | Comerford et al. |
| 4,466,694 A | 8/1984 | MacDonald |
| 4,595,839 A * | 6/1986 | Braun et al. ................ 250/551 |
| 4,704,720 A | 11/1987 | Yamaguchi |
| 4,767,168 A * | 8/1988 | Grandy ........................ 385/53 |
| 4,786,132 A | 11/1988 | Gordon |
| 4,902,092 A * | 2/1990 | Grandy ........................ 385/56 |
| 4,992,754 A | 2/1991 | Blauvelt et al. |
| 5,003,546 A | 3/1991 | Lidgard et al. |
| 5,040,868 A | 8/1991 | Waitl et al. |
| 5,064,299 A * | 11/1991 | Hirschmann et al. ........... 385/33 |
| 5,109,452 A * | 4/1992 | Selvin et al. ................... 385/69 |
| 5,161,044 A | 11/1992 | Nazarathy et al. |
| 5,172,068 A | 12/1992 | Childs |
| 5,221,984 A * | 6/1993 | Furuyama et al. ........... 398/161 |
| 5,227,736 A | 7/1993 | Tucker et al. |
| 5,242,315 A * | 9/1993 | O'Dea ......................... 439/577 |
| 5,252,930 A | 10/1993 | Blauvelt |
| 5,257,124 A | 10/1993 | Glaab et al. |

(Continued)

FOREIGN PATENT DOCUMENTS

EP    1048965 B1    11/2000

(Continued)

OTHER PUBLICATIONS

Pfister, Gregory. "Aspects of the InfiniBand Architecture." 2001 International Conference on Cluster Computing. pp. 1-3. 2002.*

(Continued)

*Primary Examiner*—Uyen Chau N Le
*Assistant Examiner*—Rhonda S Peace (57) ABSTRACT

A fiber optic communications cable for providing a short range, high speed data communications link between information system units, including an optical fiber with an integral housing at each end having an electrical connector extending from the housing and adapted to mate with a corresponding electrical connector on an external information system unit for transferring an information signal between the cable and the unit. A signal converter in the integral housing's converts the information signal between an electrical signal and a corresponding optical signal.

21 Claims, 5 Drawing Sheets

U.S. PATENT DOCUMENTS

| | | | |
|---|---|---|---|
| 5,424,680 A | 6/1995 | Nazarathy et al. | |
| 5,430,569 A | 7/1995 | Blauvelt et al. | |
| 5,436,749 A | 7/1995 | Pidgeon, Jr. et al. | |
| 5,448,661 A * | 9/1995 | Takai et al. | 385/24 |
| 5,453,868 A | 9/1995 | Blauvelt et al. | |
| 5,485,481 A | 1/1996 | Ventrudo et al. | |
| 5,506,921 A * | 4/1996 | Horie | 385/53 |
| 5,546,281 A | 8/1996 | Poplawski et al. | |
| 5,696,861 A * | 12/1997 | Schimmeyer et al. | 385/75 |
| 5,708,743 A | 1/1998 | DeAndrea et al. | |
| 5,717,533 A | 2/1998 | Poplawski et al. | |
| 5,717,804 A | 2/1998 | Pan et al. | |
| 5,812,716 A | 9/1998 | Ohishi | |
| 5,825,949 A | 10/1998 | Choy et al. | |
| 5,845,030 A | 12/1998 | Sasaki et al. | |
| 5,870,417 A | 2/1999 | Verdiell et al. | |
| RE36,820 E | 8/2000 | McGinley et al. | |
| 6,122,085 A | 9/2000 | Bitler | |
| 6,164,838 A * | 12/2000 | Maehara et al. | 385/92 |
| 6,179,627 B1 | 1/2001 | Daly et al. | |
| 6,206,578 B1 | 3/2001 | Shin et al. | |
| 6,207,950 B1 | 3/2001 | Verdiell | |
| 6,220,873 B1 | 4/2001 | Samela et al. | |
| 6,246,965 B1 | 6/2001 | Cockerham et al. | |
| 6,252,693 B1 | 6/2001 | Blauvelt | |
| 6,356,679 B1 | 3/2002 | Kapany | |
| 6,373,644 B1 | 4/2002 | Flanders | |
| 6,416,937 B1 | 7/2002 | Flanders et al. | |
| 6,446,867 B1 | 9/2002 | Sanchez | |
| 6,517,382 B2 | 2/2003 | Flickinger et al. | |
| 6,535,315 B1 | 3/2003 | Way et al. | |
| 6,538,789 B2 | 3/2003 | Sun | |
| 6,553,166 B1 * | 4/2003 | Caldwell | 385/100 |
| 6,661,814 B1 | 12/2003 | Chapman et al. | |
| 6,661,815 B1 | 12/2003 | Kozlovsky et al. | |
| 6,729,774 B1 | 5/2004 | Rast et al. | |
| 6,758,693 B2 * | 7/2004 | Inagaki et al. | 439/577 |
| 6,913,400 B2 | 7/2005 | O'Toole et al. | |
| 6,974,262 B1 * | 12/2005 | Rickenbach | 385/88 |
| 6,975,784 B1 | 12/2005 | Xu et al. | |
| 7,083,336 B2 | 8/2006 | Kim et al. | |
| 7,095,914 B2 | 8/2006 | Xu et al. | |
| 7,101,090 B2 | 9/2006 | Cheng et al. | |
| 7,114,859 B1 * | 10/2006 | Tuohimaa et al. | 385/89 |
| 7,194,167 B2 | 3/2007 | Barbarossa et al. | |
| 7,217,040 B2 | 5/2007 | Crews et al. | |
| 7,272,277 B2 | 9/2007 | Ruiz | |
| 7,295,590 B2 | 11/2007 | Crews | |
| 7,333,695 B2 | 2/2008 | Xu et al. | |
| 7,352,969 B2 | 4/2008 | Kim et al. | |
| 7,373,031 B2 | 5/2008 | Wang et al. | |
| 2005/0089281 A1 * | 4/2005 | Chiu et al. | 385/92 |
| 2005/0117913 A1 * | 6/2005 | Hung et al. | 398/139 |
| 2006/0067064 A1 | 3/2006 | Crews et al. | |
| 2006/0067630 A1 | 3/2006 | Kim | |
| 2006/0067690 A1 | 3/2006 | Tatum et al. | |
| 2006/0133820 A1 | 6/2006 | Wang et al. | |
| 2006/0133821 A1 | 6/2006 | Wang et al. | |
| 2006/0147214 A1 | 7/2006 | Ruiz et al. | |
| 2008/0175547 A1 | 7/2008 | Wang et al. | |

FOREIGN PATENT DOCUMENTS

| | | |
|---|---|---|
| EP | 1048965 A3 | 12/2000 |

OTHER PUBLICATIONS

R.G. Harrison and D. Yu, "Stimulated Brillouin Scattering", Chapter 0.1, R. Pike and P. Sabatier, eds., Scattering: Scattering and Inverse Scattering in Pure and Applied Science, © 2001, Academic Press, pp. 1-11.

R. Wyatt, W.J. Devlin, "10 kHz Linewidth 1.5 μm InGaAsP External Cavity Laser with 55nm Tuning Range", Electronic Letters, vol. 19, pp. 110-112, 1983.

D.M. Bird et al, "Narrow Line Semiconductor Laser Using Fibre Grating", Electronics Letters, vol. 27, Issue 13, pp. 1115-1116, Jun. 20, 19991.

M. Ziari et al., "High-Speed Fiber-Grating-Coupled Semiconductor Wavelength-Division Multiplexed Laser", CLEO '97, paper CMGI, May 20-22,1997, Baltimore, MD, p. 27.

M.S. Whalen et al., "Tunable Fibre-Extended-Cavity Laser", Electronics Letters, vol. 23, No. 7, pp. 313-314, Mar. 1987.

C.A. Park et al., "Single-Mode Behavior of a Multimode 1.55 μm Laser With a Fire Grating External Cavity", Electronics Letters, vol. 22, No. 21, pp. 1132-1133, Oct. 9, 1986.

E.E. Bergmann et al., "Dispersion-Induced Composite Second-Order Distortion at 1.5 μm", IEEE Photonics Technology Letters, vol. 3, No. 1, pp. 59-61, Jan. 1991.

C.Y Kuo and E.E. Bergmann, "Erbium-Doped Fiber Amplifier Second-Order Distortion in Analog Links and Electronic Compensation", IEEE Photonics Technology Letters, vol. 3, No. 9, pp. 829-831, Sep. 1991.

C.Y. Kuo, "Fundamental Second-Order Nonlinear Distortions in Analog AM CATV Transport Systems Based on Single Frequency Semiconductor Lasers", Journal of Lightwave Technology, vol. 10, No. 2, pp. 235-243, Feb. 1992.

R. Nagarajan et al., "Millimeter Wave Narrowband Optical Fiber Links Using External Cavity Semiconductor Lasers", Journal of Lightwave Technology, vol. 12, No. 1, pp. 127-136, Jan. 1994.

L. A. Coldren and T. L. Koch, "External-Cavity Laser Design", Journal of Lightwave Technology, vol. LT-2, No. 6, pp. 1045-1051, Dec. 1984.

A. Lidgard and N.A. Olsson, "Generation and Cancellation of Second-Order Harmonic Distortion in Analog Optical Systems by Interferometric FM-AM Conversion", IEEE Photonics Technology Letters, vol. 2, No. 7, pp. 519-521, Jul. 1990.

T. E. Darcie et al., "Fiber-Reflection-Induced Impairments in Lightwave AM-VSB CATV Systems", Journal of Lightwave Technology, vol. 9, No. 8, pp. 991-995. Aug. 1991.

V. Sykes, "External-Cavity Diode Lasers for Ultra-Dense WDM Networks", Lightwave, Mar. 2001.

* cited by examiner

INTEGRATED OPTICAL FIBER AND ELECTRO-OPTICAL CONVERTER

The present application is related to U.S. application Ser. No. 10/612,886 filed on Jul. 3, 2003, entitled "Modular Media Converter", the contents of which are incorporated herein by reference in its entirety.

FIELD OF THE INVENTION

The present invention relates to high speed data communications cables, and more particularly to optical fiber cables and electro-optical signal converters used for short-range coupling of information system units.

BACKGROUND OF THE INVENTION

This application is related to U.S. patent application Ser. No. 11/854,319, filed on Sep. 12, 2007.

High speed data communications networks utilize optical fiber cables for data transmission between information system units such as computers, mass data storage devices, and routers. Such units typically employ electrical connectors which couple to electrical connectors associated with electrical cables. To couple such units to an optical fiber cable, an electro-optical converter or transceiver is employed which interfaces between the electrical connector and the optical fiber cable.

Figure 1A:
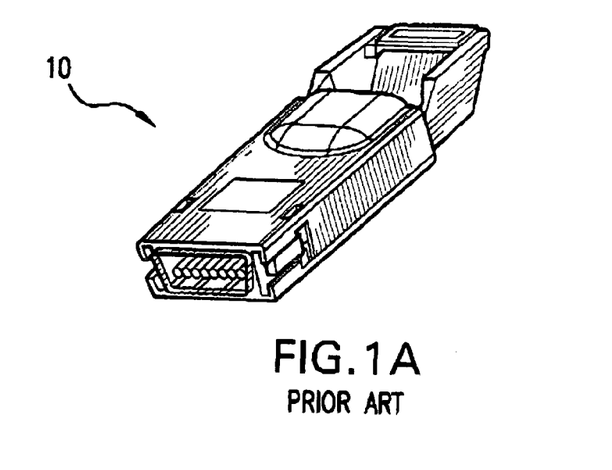
FIG. 1A shows an electrical connector plug adapted for use in a 4-channel InfiniBand™ electrical interconnects, as known in the prior art.
Figure 1B:
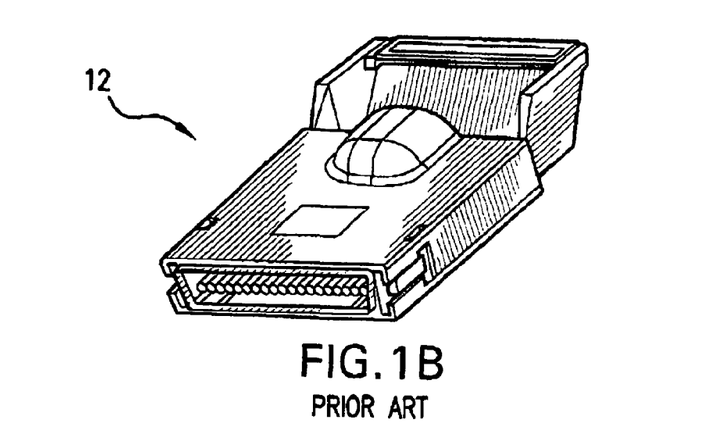
FIG. 1B shows an electrical connector plug adapted for use in a 12-channel InfiniBand™ electrical interconnects, as known in the prior art.
Figure 2A:
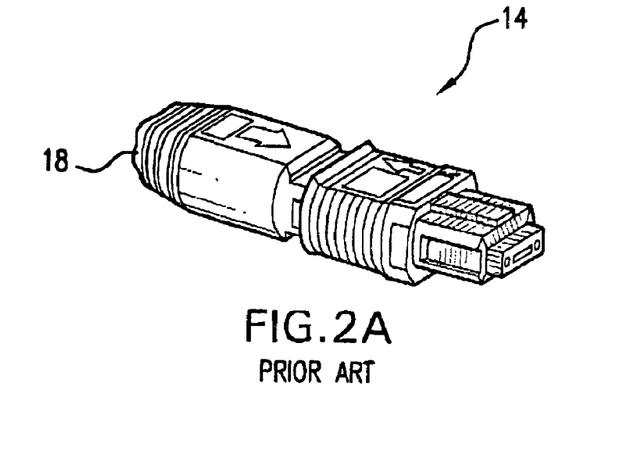
FIG. 2A shows an optical connector plug used in InfiniBand™ interconnects, as known in the prior art.
Figure 2B:
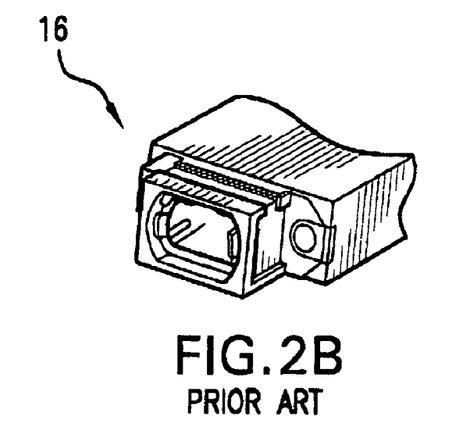
FIG. 2B shows an optical connector receptacle used in InfiniBand™ interconnects, as known in the prior art.

Examples of electrical connectors know in the prior art communications applications are illustrated in FIGS. 1A and 1B. More particularly, FIG. 1A shows an electrical connector 10 designed for use in a 4-channel InfiniBand™ electrical interconnect. FIG. 1B shows an electrical connector plug 12 designed for use in a 12-channel InfiniBand™ electrical interconnect. Electrical connectors 10 and 12 are inserted in associated electrical receptacles mounted on an information systems unit to establish electrical contact with the input/output terminals of such unit FIGS. 2A and 2B respectively show an optical cable connector 14 and an optical cable connector receptacle 16 used in InfiniBand™ 4-channel and 12-channel optical interconnects. The optical connector 14 is adapted to mate with optical connector receptacle 16 to enable the four independent optical signals traveling through four fibers in the attached optical cable 18 to communicate with corresponding receivers disposed in the optical connector receptacle 16. The committee setting standards for both 10 Giga-bit Fiber Channel (10 GFC) and 10 Giga-bit Ethernet (10 GbE) is considering to use the above described electrical and optical connector plugs/receptacles in systems complying with these standards.

Figure 3:
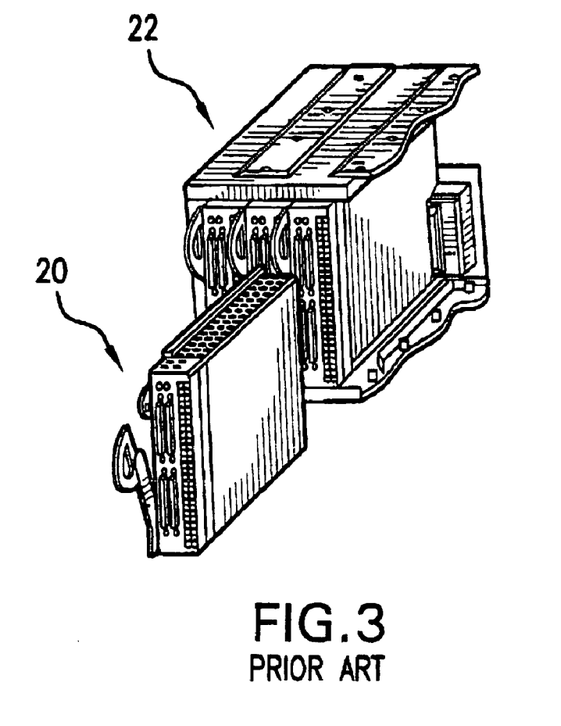
FIG. 3 shows a conventional InfiniBand™ interface card.

FIG. 3 shows a conventional InfiniBand™ interface card 20 that is adapted to be inserted in system 22. Depending on the function it is adapted to perform, the InfiniBand™ interface card 20 is commonly referred to as a Host-Channel Adapter (HCA) or a Target Channel Adapter (TCA). Each InfiniBand™ interface card 20 includes one or more printed circuit boards (PCB) that are alternatively referred to hereinbelow as host broads. Each such PCB typically includes hardware adapted to establish communication with other PCBs, with other interface cards or modules via a multitude of electrical wires or optical cables.

Figure 4A:
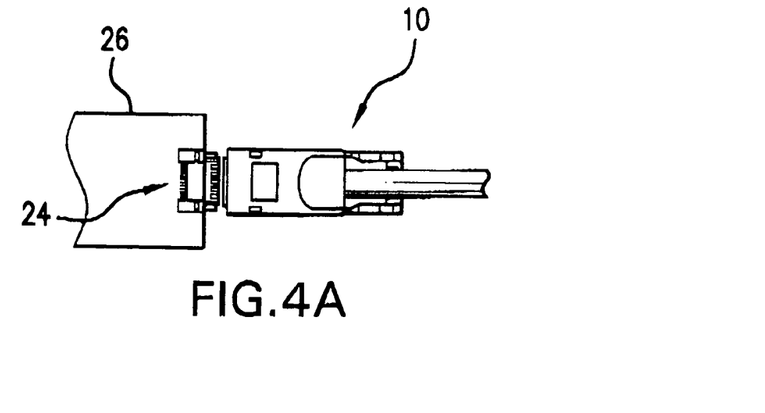
FIG. 4A shows an electrical connector receptacle mounted on a host board, and an electrical connector plug adapted to mate therewith.
Figure 4B:
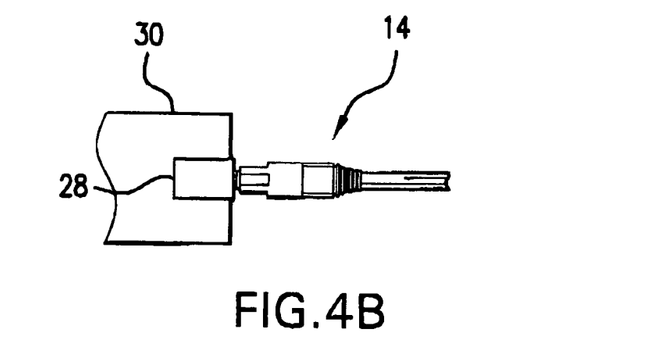
FIG. 4B shows an optical connector receptacle mounted on a host board, and an optical connector plug adapted to mate therewith.

FIG. 4A shows an electrical connector receptacle 24 mounted on a host board 26 of a TCA/HCA card. Electrical connector receptacle 24 is adapted so as to mate with electrical connector plug 10 (also see FIG. 1A). FIG. 4B shows an optical connector receptacle 28 mounted on a host board 30 of a TCA/HCA card. Optical connector receptacle 28 is adapted so as to mate with optical connector plug 14 (also see FIG. 2A).

In conventional systems, the host board is often adapted to mate with either an electrical connector plug or an optical connector plug. If the host board is adapted to mate with an electrical connector plug and a subsequent need arises to carry the signals over distances longer than those for which electrical wires, i.e., copper may be used (InfiniBand™ specification calls for copper wire to be used for distances up to 17 meters), the user may need to replace the TCA/HCA card with a card adapted to receive an optical cable so as to be able to handle optical signals, thereby increasing cost. Similarly, if the host board card is adapted to mate with an optical connector plug, and a subsequent need arises to carry the signals over a relatively shorter distances, it may be more cost effective to replace the TCA/HCA card with a card adapted to receive a copper wire so as to be able to handle electrical signals.

Accordingly, media adapters have been developed to enable optical signals carried via an optical cable to be coupled to electrical receptacles. Such media adapters include a fiber optic cable with an electrical plug coupled to on one end and an optical plug coupled to another end. The electrical plug is adapted to mate with an electrical connector receptacle on a host board and the optical plug is adapted to mate with an optical connector receptacle. The electrical signals present on the electrical receptacle are converted to optical signals by a transceiver disposed in the media adapter and carried over fiber optic cable. Conventional media adapters are connectorized and are thus relatively expensive. Furthermore, safety issues remain a concern if a user detaches the optical cable from the coupling plugs and looks at the light beams emanating from the lasers disposed therein.

BRIEF SUMMARY OF THE INVENTION

Briefly, and in general terms, the present invention provides a communications cable for providing a short range, high speed data communications link between information system units including an optical fiber with an integral housing at each end having an electrical connector extending from the housing and adapted to mate with a corresponding electrical connector on an external information system unit for transferring an information signal between the cable and the unit; and a signal converter in the integral housing connected to the electrical connector for converting an information signal between an electrical signal and a corresponding optical signal. In accordance with one embodiment of the present invention, a cable assembly includes a fiber optic cable with a pair of optical connector plugs coupled to each one of its ends. The optical connector plugs are adapted to mate with two electrical connector receptacles already present on two host boards. The cable assembly thus enables communication between the electrical receptacles of the two host boards to be carried out via optical signals. In other words, the cable assembly is adapted to receive electrical signals from a first electrical receptacle—mounted on the first host board—via one of its optical connector plugs, and subsequently convert the received electrical signals to optical signals and deliver the optical signals via the fiber optic cable to the other optical connector plug. The receiving optical connector plug converts the optical signals to electrical signals and delivers the converted electrical signal to the second electrical connector receptacle mounted on the second host board.

The electrical connector receptacle has physical and electrical characteristics defined by the same standard as that defining the physical and electrical characteristic of the optical plugs. Accordingly, the same electrical receptacle on the host board may be used to receive both an electrical connector plug or the optical connector plug of the cable assembly. Accordingly, if the distance between the two electrical connector receptacles (i.e., the two host boards) is, e.g., more than 15 meters, a cable assembly, in accordance with the present invention, may be used to establish communication between the two host boards. If, on the other hand, the distance between the two host boards is, e.g., less than 15 meters, a conventional copper cable with standard electrical connector plugs may be used to establish communication between the two host boards.

Each optical plug includes, in part, an optical engine mounted on a board, a top housing shell, and a bottom housing shell. In some embodiments, the fiber optic cable is attached to the optical plugs via a strain relief boot. Because the fiber optic cable is attached to the optical plugs and may not be easily removed, the user is not exposed to safety hazards that may result from viewing the laser beams. In other embodiments, the fiber optic cable is glued to the optical plugs.

In accordance with another embodiment of the present invention, a cable assembly includes, in part, a connector plug from which a fiber optic cable and an electrical cable are fanned out. The connector plug receives and processes (e.g., amplify, filter, etc.) electrical signals from an electrical connector receptacle mounted on a host board. The processed signals that are to be transmitted via the fiber optic cable are converted to optical signals using an optical engine. The processed signals that are to be transmitted via the electrical cable may be further processed before being transmitted. In some embodiments, the signals transmitted by the fiber optic cable may be the same as those transmitted by the electrical cable and may include the entire set of the signals received from the connector receptacle. In yet other embodiments, the signals transmitted by the fiber optic cable may be different from those transmitted by the electrical cable.

In some embodiments of the present invention, the optical engines as well as the integrated circuits are powered by circuitry disposed on the host boards via the same supply voltages which power the components on the host boards. One or more of the connectors of the electrical receptacles are configured to deliver the supply voltages to the optical engines as well as the integrated circuits mounted on one or more boards disposed within the connector plug and configured to process the received electrical signals.

DETAILED DESCRIPTION OF THE INVENTION

In accordance with one embodiment of the present invention, a cable assembly includes a fiber optic cable with a pair of optical connector plugs coupled to each one of its ends. The optical connector plugs are adapted to mate with two electrical connector receptacles already present on two host boards. The cable assembly thus enables communication between the electrical receptacles of the two host boards to be carried out via optical signals. In other words, the cable assembly is adapted to receive electrical signals from a first electrical receptacle—mounted on the first host board—via one of its optical connector plugs, and subsequently convert the received electrical signals to optical signals and deliver the optical signals via the fiber optic cable to the other optical connector plug. The receiving connector plug converts the optical signals to electrical signals and delivers the converted electrical signal to the second electrical connector receptacle mounted on the second host board.

The electrical connector receptacle has physical and electrical characteristics defined by the same standard as that defining the physical and electrical characteristic of the optical plugs. Accordingly, the same electrical receptacle on the host board may be used to receive both an electrical connector plug or the optical connector plug of the cable assembly. Accordingly, if the distance between the two electrical connector receptacles (i.e., the two host boards) is, e.g., more than 15 meters, a cable assembly, in accordance with the present invention, may be used to establish communication between the two host boards. If, on the other hand, the distance between the two host boards is, e.g., less than 15 meters, a conventional copper cable with standard electrical connector plugs may be used to establish communication between the two host boards.

Figure 5:
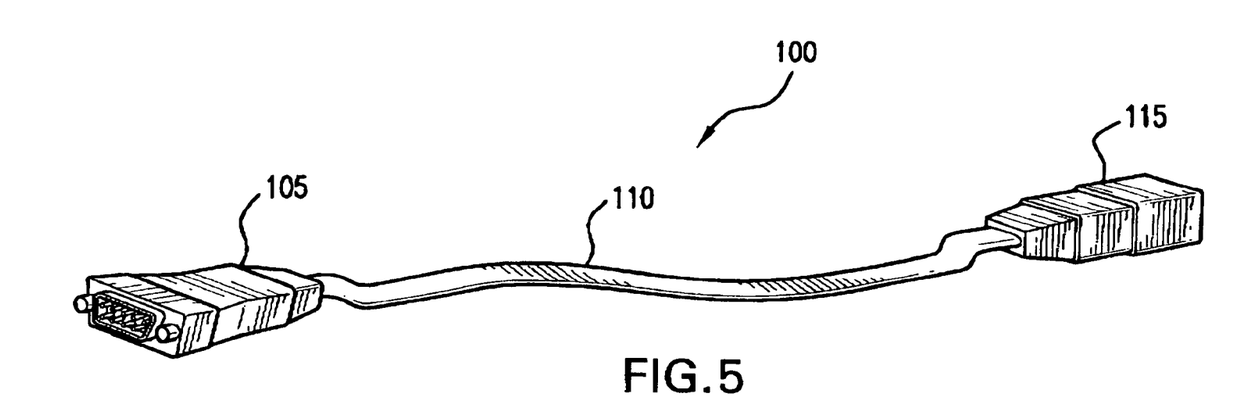
FIG. 5 shows a cable assembly, in accordance with a first embodiment of the present invention.

FIG. 5 shows a cable assembly 100, in accordance with one embodiment of the present invention. Cable assembly 100 includes, in part, a fiber optic cable 110, a first optical connector plug 105 coupled to a first end of fiber optic cable 110, and a second optical connector plug 115 coupled to a second end of fiber optic cable 110. Each of the optical connector plugs (hereinafter alternatively referred to as optical plug) 105, and 115, is adapted to mate with a different electrical connector receptacle mounted on a host board, such as electrical receptacle 104 of host board 106, shown in FIG. 6.

Figure 6:
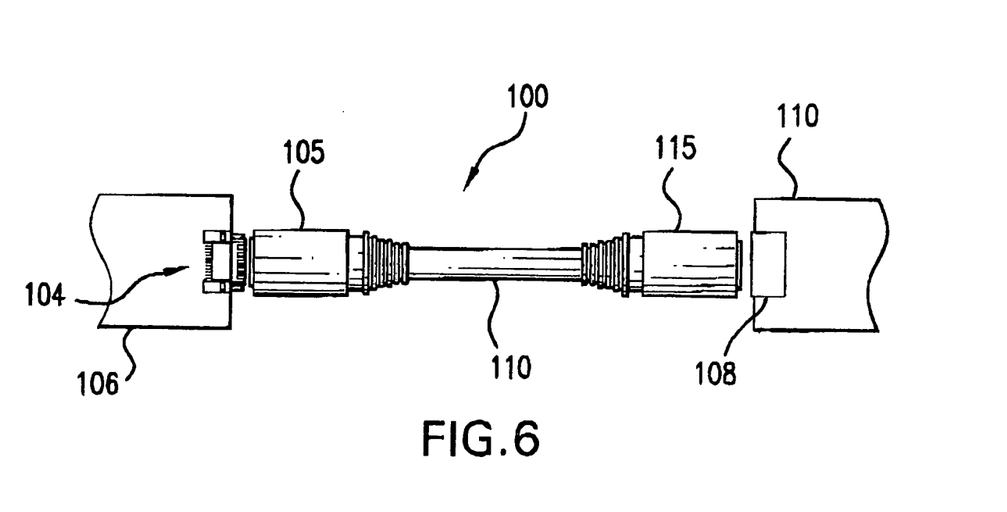
FIG. 6 shows the cable assembly of FIG. 5 positioned to establish communications between a pair of electrical connector receptacles mounted on two different host boards.

In FIG. 6 cable assembly 100 is shown as being in alignment with electrical receptacle 104—mounted on host board 106—and electrical receptacle 108 that is mounted on electrical host board 110. If the distance d between host board 106 and 110 is less than the maximum recommended distance for which copper cable is adapted to be used, a copper cable (not shown), such as Category 5 cable, may be used to connect electrical receptacle 104 with electrical receptacle 108 in order to establish communication between these two electrical receptacles. If, on the other hand, distance d between host board 106 and 110 is greater than the maximum recommended distance for which copper cable is adapted to be used, connector plug 105 is mated directly with electrical receptacle 104 and connector plug 115 is mated directly with electrical receptacle 108 in order to establish communication between these two electrical receptacles.

Disposed within each plug 105 and 115 of cable assembly 100 is an electrical/optical engine (hereinafter alternatively referred to as optical engine) adapted to convert electrical signals to optical signals and vice versa. As known to those skilled in the art, each optical engine includes components such as, lasers, lenses, laser drivers, etc. The optical engine in each optical plug, e.g. optical plug 105, is adapted to receive electrical signals from its mating electrical receptacle, e.g., electrical receptacle 104, convert that electrical signal to optical signal, and thereafter deliver that optical signal via fiber optic cable 110 to the other optical plug, e.g., optical plug 115. The optical plug 115 receiving the optical signal converts the received optical signal to electrical signal and delivers the converted electrical signal to, e.g., electrical receptacle 108.

Figure 7:
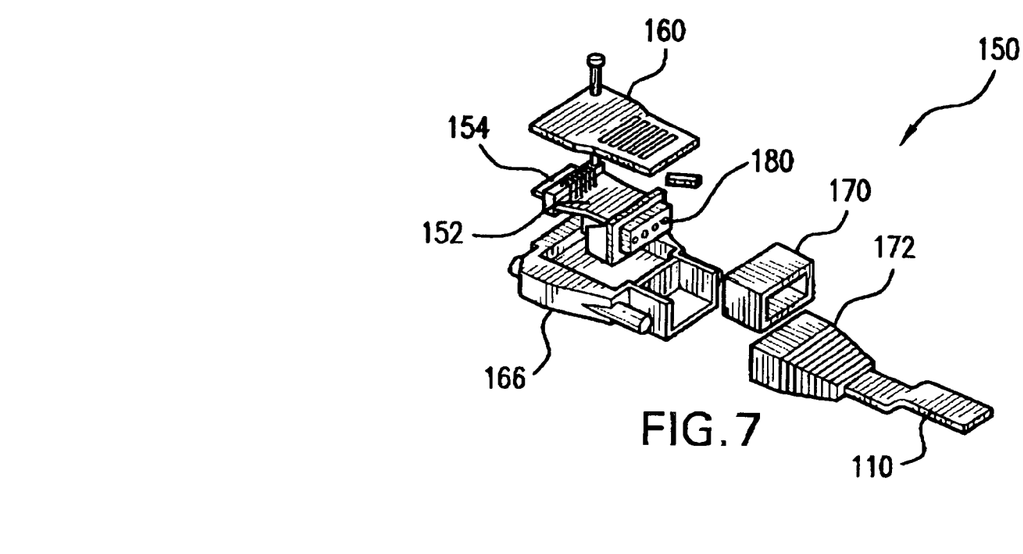
FIG. 7 is an exploded view of one exemplary embodiment of the optical connector plug of the cable assembly of FIG. 5.

FIG. 7 is an exploded view of one exemplary embodiment 150 of each of optical plugs 105, 110. Optical plug 150 is shown as including, in part, an optical engine 180 mounted on board 152, top housing shell 160, bottom housing shell 166 sleeve 170, and strain relief boot 172. The optical engine 150 is mounted and secured to board 152. Thereafter, the board 152 is disposed between top and bottom housing members 160 and 166. It is understood that board 152 may be a flexible circuit board or a rigid circuit board. In the embodiment 150, the optical engine 180 is an optical transceiver, however, in other embodiments, the optical engine 180 may be an optical transmitter or an optical receiver. A train relief boot 172 is adapted to prevent fiber optic cable 110 from being detached from optical plug 150. Since fiber optic cable 110 is attached to optical plug 150 and may not be easily removed, the user is not exposed to safety hazards that may result from viewing the laser beams present therein.

Optical plug 150 complies with the same industry standard with which host board 106 and electrical receptacle 104 also comply. For example, if host board 106 and electrical receptacle 104 are formed in accordance with InfiniBand™ specifications, optical plug 150 is also compliant with InfiniBand™ specifications. If host board 106 and electrical receptacle 104 are formed so as to comply with Host-Channel Adapter (HCA) or a Target Channel Adapter (TCA) specifications and standards, optical plug 150 is also compliant with these specifications and standards. Therefore, board 152 is formed so as to receive any standard compliant optical engine.

Figure 8:
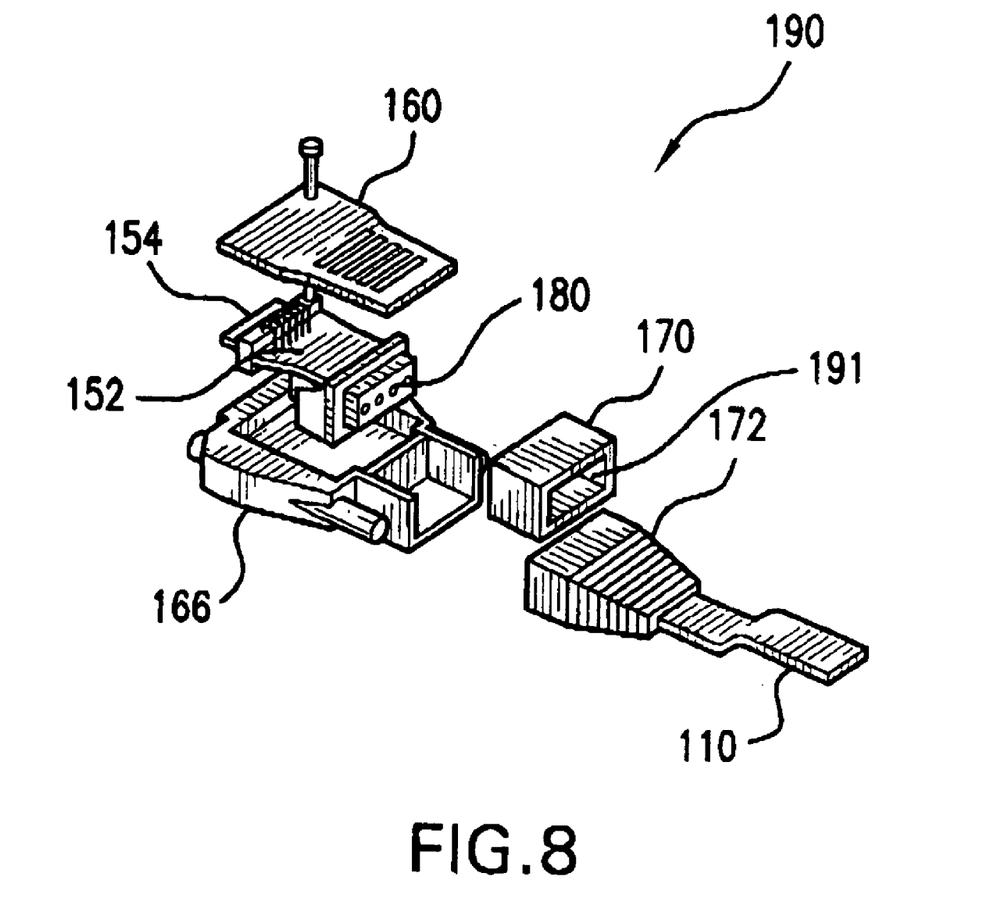
FIG. 8 is an exploded view of another exemplary embodiment of the optical connector plug of the cable assembly of FIG. 5.

FIG. 8 is an exploded view of another exemplary embodiment 190 of each of optical plugs 105, 110. Optical plug 190 is shown as including, in part, an optical engine 180 mounted on board 152, top housing shell 160, bottom housing shell 166, and sleeve 170. In accordance with this embodiment, fiber optic cable 110 is affixed to optical plug 190 via glue 191, or other adhesive, so as not to be easily removed. The user is therefore not exposed to safety hazards that may result from viewing the laser beams. The glue used in accordance with this embodiment, is adapted to maintain its properties under a wide range of temperatures and is available from a number of vendors, such as 3M Co, located at 3M Center, St. Paul, Minn., 55144, USA.

As described above, cable assembly 100 dispenses the need for replacing electrical receptacle 104 or host board 106 in the field if a decision is made to use an optical fiber in place of copper wires as the transmission medium. As described above, optical engine 180 may be supplied or manufactured by any commercial vendor or manufacturer so long as it complies with the same standard as that with which host board 106 or electrical receptacle 104 are also adapted to comply.

Because fiber optic cable 110 is not connectorized (i.e., fiber optic cable 110 may not be detached from the optical plugs) it provides a relatively high level of eye safety. Furthermore, because fiber optic cable 110 is not connectorized, it has improved matched ends properties, as described further below. In a conventional connectorized optical cable, a first optical engine coupled to a first end of the optical cable is required to operate with any optical engine coupled to the other end of the optical cable, notwithstanding their respective manufactures. Therefore, the first optical engine is required to function over a wide range of operating conditions, resulting in yield loss and a relatively more extensive testing. In contrast, because the two optical engines disposed at the two ends of cable assembly 100, are only required to operate with each other, they are easier two match; in other words, cable assembly 100 has matched ends. Moreover, in accordance with the present invention, because the two optical engines are matched, a higher manufacturing yield is achieved and less extensive testing of the optical engines are required.

In the embodiment shown in FIGS. 7-8, optical engine 180 is mounted to board 152 via a fastener, such as a screw or bolt. In other embodiments, optical engine 180 may be, for example, soldered to board 152. In some embodiment, optical engine 180 may have four-channels. In yet other embodiments, optical engine 180 may have, e.g., twelve channels.

It is understood that the above embodiments of the present invention are illustrative and not limitative. For example, the invention in not limited by the type of optical engine disposed in the optical plug of each end of the assembly cable. The invention is not limited by the type of circuit board, flexible or rigid, on which the optical engine is mounted. The invention is not limited by the number of channels, speed or specific electrical or optical configuration that, e.g., the optical engine is adapted to handle. Other variations, modifications, additions, deletions are obvious in light of the above disclosure and are intended to fall within the scope of the appended claims.

What is claimed is:

1. A communications cable for providing a short range, high speed data communications link between information system units comprising:
   a first integral housing, said integral housing including
   a first electrical connector plug extending from the first housing, said first connector plug having a plurality of terminals with a set of at least some terminals assigned to each of a plurality of communication channels where the sets of terminals of the communication channels are noncoincident and the first electrical connector plug is adapted to detachably mate with a corresponding electrical receptacle on an external information system unit for transferring an information signal on each of the plurality of channels between the cable and the external unit and to allow the cable to be connected or disconnected from the external system unit;
   a first circuit board disposed within the first integral housing;
   a first multi-channel signal converter disposed on the first circuit board, the first signal converter having a plurality of channels that transmit or receive an information signal through each of at least some of the plurality of channels and wherein each channel of the plurality of channels of the first signal converter is connected to a respective channel of the first electrical connector plug for processing and converting the information signal on each of the plurality of channels between an electrical signal and a corresponding optical signal;

a second integral housing, said second integral housing including a second electrical connector plug extending from the second housing, said second connector plug having a plurality of terminals with a set of at least some terminals assigned to each of a plurality of communication channels where the sets of terminals of the communication channels are noncoincident and the second electrical connector plug is adapted to detachably mate with a corresponding electrical receptacle on a first remote information system unit for transferring an information signal on each of the plurality of channels between the cable and the remote unit and to allow the cable to be connected or disconnected from the remote unit;

a second circuit board disposed within the second integral housing;

a second multi-channel signal converter disposed on the second circuit board, the second signal converter having a plurality of channels that transmit or receive an information signal through each of at least some of the plurality of channels and wherein each channel of the plurality of channels of the second signal converter is connected to a respective channel of the second electrical connector plug for processing and converting the information signal on each of the plurality of channels between an electrical signal and a corresponding optical signal; and a short range optical fiber cable having a length of less than 100 meters coupled to said first and second signal converters and extending between the first and second housings for transmitting an optical signal over a distance between the external unit and the first remote information system unit.

2. A communications cable as defined in claim 1, wherein the electrical connector plug further comprises an Infiniband connector and wherein the multi-channel signal converters simultaneously transmit and receive at least four bits of differential data.

3. A communications cable as defined in claim 1, wherein the signal converter comprises a plurality of lasers and laser drivers.

4. A communication cable as in claim 1 wherein the optical fiber cable is the sole connection between the first integral housing and the remote unit, and the cable comprises a single optical fiber.

5. A communication cable as in claim 1 wherein the second signal converter is similar to or matched with the first signal converter.

6. A communications cable for providing a short range, high speed data communications link between information system units comprising:

a first plug disposed on a first end of the communication cable;

a first electrical connector extending from the first plug, said first electrical connector having a plurality of terminals with a set of at least some of the terminals assigned to each of a plurality of communication channels where the sets of terminals are non-coincident, said first electrical connector extending from the first plug and adapted to detachably mate with a corresponding electrical connector on an external information system unit for transferring an information signal on each of the plurality of channels between the cable and the external unit and to allow the cable to be connected or disconnected from the unit;

a first multi-channel signal processor disposed within the first plug, said first processor having a plurality of channels that transmit or receive data over the plurality of channels, wherein each channel of the plurality of channels of the first signal processor is connected to a respective channel of the first electrical connector for processing and converting an information signal on each of the channels between an electrical signal and a corresponding optical signal;

a second plug disposed on a second end of the communication cable;

a second electrical connector extending from the second plug, said second electrical connector having a plurality of terminals with a set of at least some of the terminals assigned to each of a plurality of communication channels where the sets of terminals are non-coincident, said second electrical connector extending from the second plug and adapted to detachably mate with a corresponding electrical connector on a first remote information system unit for transferring an information signal on each of the plurality of channels between the cable and the remote unit and to allow the cable to be connected or disconnected from the remote unit;

a second multi-channel signal processor disposed within the second plug, said second processor having a plurality of channels that transmit or receive data over the plurality of channels, wherein each channel of the plurality of channels of the second signal processor is connected to a respective channel of the second electrical connector for processing and converting an information signal on each of the channels between an electrical signal and a corresponding optical signal; and a short range optical fiber cable having a length less than 100 meters coupled to said first and second signal converters and extending between the first and second plugs for transmitting an optical signal over a distance between the external unit and the first remote information system unit.

7. The communications cable as defined in claim 6, wherein the electrical connector.

8. The communications cable as defined in claim 6, further comprising a plurality of lasers and laser drivers disposed within said first and second plugs.

9. A communication cable as in claim 6 wherein the optical fiber cable is the sole connection between the first and second plugs and the cable comprises a single optical fiber and wherein the communication cable is a copper cable replacement.

10. A communications cable for providing a short range, high speed data communications link between information system units comprising:

a first termination plug disposed on a first end of the communication cable;

a first circuit board disposed within the first plug, said first circuit board having a plurality of integrated circuits including a first multi-channel signal converter with a plurality of channels disposed on the first circuit board for processing and converting an information signal on each of the plurality of channels between an electrical signal and a corresponding optical signal;

a first electrical connector plug coupled to the first circuit board, said first electrical connector plug disposed in and extending from the first termination plug, said first electrical connector plug having a plurality of terminals with a different set of at least some terminals assigned to each of a plurality of communication channels and adapted to mate with a corresponding electrical connector on an external information system unit for transferring the plurality of information signals of the of the first multi-channel signal converter between the cable and the external unit through the respective terminals of the plurality of terminals;

a second termination plug disposed on a second end of the communication cable;

a second circuit board disposed within the second plug, said second circuit board having a plurality of integrated circuits including a second multi-channel signal converter with a plurality of channels disposed on the second circuit board for processing and converting an information signal on each of the plurality of channels between an electrical signal and a corresponding optical signal;

a second electrical connector plug coupled to the second circuit board, said second electrical connector plug disposed in and extending from the second termination plug, said second electrical connector plug having a plurality of terminals with a different set of at least some terminals assigned to each of a plurality of communication channels and adapted to mate with a corresponding electrical connector on a first remote information system unit for transferring the plurality of information signals of the of the second multi-channel signal converter between the cable and the unit through the respective terminals of the plurality of terminals; and a short range optical fiber cable having a length less than 100 meters coupled to the first and second circuit boards and extending between the first and second termination plugs for transmitting an optical signal over a distance between the external unit and the first remote information system unit.

11. The communications cable as defined in claim 10, wherein the electrical connector plug is an Infiniband connector.

12. The communications cable as defined in claim 10, further comprising a plurality of lasers and laser drivers disposed within said first and second termination plugs.

13. A communication cable as in claim 10 wherein the optical fiber is the sole connection between the first and second termination plugs and the cable comprises a single optical fiber and wherein the communication cable is a copper cable replacement.

14. A communications cable for providing a short range, high speed data communications link between information system units comprising:

a first integral housing including a first electrical connector plug extending from the first housing and adapted to detachably mate with a corresponding electrical connector on an external information system unit for transferring a plurality of information signal through respective terminals of the first electrical connector plug between the cable and the external unit and to allow the cable to be connected and disconnected from the external system unit;

a first multi-channel signal converter connected to the first electrical connector plug, said first multi-channel signal converter having a plurality of channels that transmit or receive an information signal over each of the plurality of channels, each of said plurality of channels of the first multi-channel signal converter having a respective optical transmitter and receiver and each coupled to the respective terminals of an information signal of the plurality of information signals for processing and converting an information signal between an electrical signal and a corresponding optical signal;

a second integral housing including a second electrical connector plug extending from the second housing and adapted to detachably mate with a corresponding electrical connector on a first remote information system unit for transferring a plurality of information signal through respective terminals of the second electrical connector plug between the cable and the remote external unit and to allow the cable to be connected and disconnected from the remote system unit;

a second multi-channel signal converter connected to the second electrical connector plug, said second multi-channel signal converter having a plurality of channels that transmit or receive an information signal over each of the plurality of channels, each of said plurality of channels of the second multi-channel signal converter having a respective optical transmitter and receiver and each coupled to the respective terminals of an information signal of the plurality of information signals for processing and converting an information signal between an electrical signal and a corresponding optical signal; and at least one short range optical fiber having a length less than 100 meters coupled to said first and second signal converters and extending between the first and second housings for transmitting an optical signal over a distance between the external unit and the first remote information system unit.

15. A communications cable as defined in claim 14, wherein the electrical connector plug is an Infiniband connector.

16. A communications cable as defined in claim 14, further comprising a plurality of lasers and laser drivers disposed within said first and second integral housings.

17. A communication cable as in claim 14 wherein the optical fiber is the sole connection between the first and second integral housings and comprises a single optical fiber and wherein the communication cable is a copper cable replacement.

18. A communications cable for providing a short range, high speed data communications link between information system units comprising:

a short range optical fiber cable having a length less than 100 meters;

an electrical connector plug disposed on each of the opposing ends of the optical fiber cable for electrically connecting to a respective external device, each connector plug having a plurality of terminals with at least some terminals assigned to each of a plurality of communication channels where the sets of terminals of the communication channels are non coincident;

a multi-channel electro/optical converter disposed within each of the electrical connector plugs, said multi-channel electro/optical converter having a plurality of channels that transmit or receive data on each of the plurality of channels, each with a respective optical transmitter and optical receiver wherein each channel of the plurality of channels of the multi-channel electro/optical converter is connected to a respective communication channel of the electrical connector plug and where the electro/optical converter processes and converts between an information signal within the optical fiber cable and a corresponding electrical signal, wherein the electro/optical converter receives electrical power through the electrical connector plug from an external device when connected thereto.

19. A communication cable as in claim 18 wherein the optical fiber cable is the sole connection between the electrical connectors on opposing ends and the cable comprises a single optical fiber and wherein the communication cable is a copper cable replacement.

20. A high speed communication cable for providing a short range, high speed data communications link between information system units comprising:

a short range optical fiber having a length less than 100 meters;

a first connector optical plug integral to the fiber on a first end of the fiber including a housing with an electrical connector plug for coupling with a first information system device and for transmitting a plurality of information-containing electrical signals over respective terminals of said first connector plug;

a multi-channel electro/optical conversion means disposed inside the housing of said first connector plug, said electro/optical conversion means having a plurality of channels that transmit or receive data through the plurality of channels, each with a respective optical transmitter and receiver, each channel of the multi-channel electro/optical conversion means coupled to the respective terminals of an information containing electrical signal of the plurality of information signals for processing and converting between the electrical signal and a modulated optical signal corresponding to the electrical signal, and coupling the optical signal to or from said optical fiber;

a second optical connector plug integral to the fiber on a second end of the fiber including a housing with an electrical connector plug for coupling with a second information system device and for transmitting the plurality of information-containing electrical signals over respective terminals said second connector plug; and multi-channel electro/optical conversion means disposed inside the housing of said second connector plug, said electro/optical conversion means having a plurality of channels, each with a respective optical transmitter and receiver, each channel of the electro/optical conversion means transmitting or receiving data and where each channel of the electro/optical conversion means is coupled to the respective terminals of an information containing electrical signal of the plurality of the plurality of information containing electrical signals for converting between the electrical signal of the information containing electrical signals and a modulated optical signal corresponding to the electrical signal, and coupling the optical signal to or from said optical fiber.

21. A high speed communication cable as in claim 20 wherein the optical fiber is the sole connection between the first and second connector optical plugs.

* * * * *